(12) United States Patent
Situ et al.

(10) Patent No.: US 11,855,797 B2
(45) Date of Patent: Dec. 26, 2023

(54) HOUSEHOLD APPLIANCE AND NETWORK CONFIGURATION METHOD THEREOF, CONTROL TERMINAL, AND COMPUTER STORAGE MEDIUM

(71) Applicants: GD MIDEA AIR-CONDITIONING EQUIPMENT CO., LTD., Foshan (CN); MIDEA GROUP CO., LTD., Foshan (CN)

(72) Inventors: Jinquan Situ, Foshan (CN); Weiming Huo, Foshan (CN)

(73) Assignees: GD MIDEA AIR-CONDITIONING EQUIPMENT CO., LTD., Foshan (CN); MIDEA GROUP CO., LTD., Foshan (CN)

( * ) Notice: Subject to any disclaimer, the term of this patent is extended or adjusted under 35 U.S.C. 154(b) by 0 days.

(21) Appl. No.: 17/921,561

(22) PCT Filed: Mar. 17, 2021

(86) PCT No.: PCT/CN2021/081347
§ 371 (c)(1),
(2) Date: Oct. 26, 2022

(87) PCT Pub. No.: WO2021/248963
PCT Pub. Date: Dec. 16, 2021

(65) Prior Publication Data
US 2023/0163991 A1    May 25, 2023

(30) Foreign Application Priority Data
Jun. 9, 2020    (CN) .......................... 202010521713.8

(51) Int. Cl.
*H04L 12/28*    (2006.01)
*H04L 9/40*    (2022.01)

(52) U.S. Cl.
CPC ........ *H04L 12/2807* (2013.01); *H04L 63/107* (2013.01); *H04L 2012/2841* (2013.01)

(58) Field of Classification Search
CPC ............. H04L 12/2807; H04L 12/2809; H04L 63/107; H04L 2012/2847; H04L 2012/285; H04L 12/28; H04L 9/40; H04L 12/12
See application file for complete search history.

(56) References Cited

U.S. PATENT DOCUMENTS 8,572,411 B2 * 10/2013 Ginter .................... H04N 7/162
                                                      345/59
9,301,084 B2 *  3/2016 Kim .................... H04L 41/0846
(Continued)

FOREIGN PATENT DOCUMENTS

CN    103914041 A    7/2014
CN    103941664 A    7/2014
(Continued)

OTHER PUBLICATIONS

World Intellectual Property Organization (WIPO) International Search Report and Written Opinion for PCT/CN2021/081347 dated Jun. 8, 2021 12 Pages (with translation).
(Continued)

*Primary Examiner* — Sargon N Nano
(74) *Attorney, Agent, or Firm* — ANOVA LAW GROUP PLLC

(57) ABSTRACT

A household appliance network configuration method includes searching by a control terminal for connection information, establishing by the control terminal a connection with a household appliance in response to finding the connection information of the household appliance, sending network configuration information corresponding to the household appliance to the household appliance to cause the household appliance to perform network configuration
(Continued)

according to the network configuration information, and authenticating the control terminal after the network configuration is successfully performed.

12 Claims, 10 Drawing Sheets

(56) References Cited

U.S. PATENT DOCUMENTS

| | | | | |
|---|---|---|---|---|
| 10,177,932 | B2* | 1/2019 | Boeldt | D06F 34/05 |
| 10,574,475 | B2* | 2/2020 | Drake | H04L 12/2809 |
| 11,133,944 | B2* | 9/2021 | Yang | G01S 17/36 |
| 11,310,730 | B2* | 4/2022 | Huang | H04L 12/2838 |
| 11,588,655 | B2* | 2/2023 | Yang | H04W 12/08 |
| 2014/0362991 | A1* | 12/2014 | Ebrom | H04W 12/64 380/270 |
| 2016/0195959 | A1* | 7/2016 | Lee | G06F 3/04166 345/174 |
| 2018/0049253 | A1 | 2/2018 | Lee et al. | |
| 2019/0363904 | A1 | 11/2019 | Drake | |
| 2021/0068068 | A1* | 3/2021 | Lee | H04W 8/005 |
| 2022/0239524 | A1* | 7/2022 | Chen | H04W 48/16 |
| 2022/0417052 | A1* | 12/2022 | Kong | H04L 12/2814 |

FOREIGN PATENT DOCUMENTS

| | | |
|---|---|---|
| CN | 106059837 A | 10/2016 |
| CN | 106789462 A | 5/2017 |
| CN | 110177362 A | 8/2019 |
| CN | 110300432 A | 10/2019 |
| EP | 3104549 A1 | 12/2016 |
| WO | 2018030860 A1 | 2/2018 |

OTHER PUBLICATIONS

The China National Intellectual Property Administration (CNIPA) the First Office Action for Chinese Application 202010521713.8 dated Apr. 6, 2022 15 Pages (With Translation).
The European Patent Office (EPO) Office Action for EP Application No. 21822569.6 dated Sep. 6, 2023 8 Pages.

* cited by examiner

HOUSEHOLD APPLIANCE AND NETWORK CONFIGURATION METHOD THEREOF, CONTROL TERMINAL, AND COMPUTER STORAGE MEDIUM

CROSS-REFERENCE TO RELATED APPLICATIONS

This application is a National Stage Entry under 35 U.S.C. § 371 of International Application No. PCT/CN2021/081347, filed on Mar. 17, 2021, which claims priority to Chinese Patent Application No. 202010521713.8, filed on Jun. 9, 2020, the entire contents of both of which are incorporated herein by reference.

TECHNICAL FIELD

The present disclosure relates to the field of household appliances, and in particular, to a household appliance and a network configuration method thereof, a control terminal, and a computer storage medium.

BACKGROUND

With the intelligent development of household appliances, more household appliances can be controlled remotely. Therefore, each household appliance needs to perform network configuration. After the network configuration is successfully performed, the household appliance can be remotely controlled through the network.

Before the current smart household appliances perform network configuration, it is generally needed to instruct the user to press some hot keys (such as the remote control screen display button 5 times, the household appliance switch button or a specific network configuration button, or the like) to enter the network configuration mode. If the operation is wrong, the network needs to be reconfigured, which increases the difficulty of the network configuration, or even fails to configure the network, resulting in the failure of the network configuration.

Technical Problem

The embodiments of the present disclosure provide a household appliance and a network configuration method thereof, a control terminal, and a computer storage medium, which solve the problem that in the related art due to the wrong operation of the network configuration, the household appliances are difficult to perform network configuration, and even the household appliances fail to perform network configuration.

Technical Solutions

The embodiments of the present disclosure provide a control method for a household appliance, including following operations:

searching for, by a control terminal, connection information of nearby household appliance, and establishing a connection with the household appliance when the connection information of the household appliance is found;

sending network configuration information corresponding to the household appliance to the household appliance that has established a connection, to make the household appliance perform network configuration according to the network configuration information; and authenticating the control terminal after the network configuration is successfully performed, to realize control of the household appliance by the control terminal.

In an embodiment, the operation of authenticating the control terminal after the network configuration is successfully performed includes:

generating authorization guide prompt information after the network configuration is successfully performed, to make the control terminal generate an authorization request to a cloud server according to the authorization guide; and determining that the control terminal has been authenticated in response to receiving an authorization response from the cloud server.

In an embodiment, the authorization guide prompt information is "Execute a preset operation on a preset button" or "Bring the control terminal close to the household appliance."

In an embodiment, the operation of authenticating the control terminal after the network configuration is successfully performed includes:

sending an authorization request to a cloud server after the network configuration is successfully performed, to make the cloud server return an authorization response when a preset button of the household appliance is triggered according to the authorization request; and determining that the control terminal has been authenticated in response to receiving the authorization response from the cloud server.

In an embodiment, the operation of authenticating the control terminal after the network configuration is successfully performed includes:

sending a signal strength of the control terminal to a server, and sending an authorization request to a cloud server after the network configuration is successfully performed, for the cloud server to determine whether a distance between the control terminal and the household appliance is within a preset distance range according to the signal strength of the control terminal, and in response to that the distance between the control terminal and the household appliance is within the preset distance range, returning an authorization response; and determining that the control terminal has been authenticated in response to receiving the authorization response.

In an embodiment, before the operation of searching for, by the control terminal, the connection information of nearby household appliance, and establishing the connection with the household appliance when the connection information is found, the method further includes:

obtaining, by the control terminal, device information of the household appliance waiting for network configuration, to make the control terminal search for the connection information of the household appliance matching a type of the household appliance in the device information.

The embodiments of the present disclosure further provide a method for configuring a network for a household appliance, including following operations:

sending, by the household appliance, a network configuration connection request, wherein the network configuration connection request includes connection information of the household appliance, to make a control terminal send network configuration information after connecting with the household appliance through the connection information;

receiving the network configuration information sent by the control terminal, and performing network configuration according to the received network configuration information; and authenticating the control terminal after the network configuration is successfully performed, to realize control of the household appliance by the control terminal.

In an embodiment, before the operation of sending, by the household appliance, the network configuration connection request, the method further includes:

generating the network configuration connection request when the household appliance is powered on.

In an embodiment, in response to that the household appliance is a Bluetooth device, the household appliance sends the network configuration connection request by starting a Bluetooth broadcast; or in response to that the household appliance is a WiFi device, the household appliance sends the network configuration connection request by starting a wireless access point.

In an embodiment, the operation of authenticating the control terminal after the network configuration is successfully performed includes:

determining whether a preset button of the household appliance is triggered after the network configuration is successfully performed; and sending an authorization response to the control terminal through a cloud server in response to that the preset button of the household appliance is triggered.

The embodiments of the present disclosure further provide a control terminal, including: a memory, a processor, and a network configuration program of a household appliance stored in the memory and running on the processor, when the processor executes the network configuration program, the method of any one of the above embodiments is implemented.

The embodiments of the present disclosure further provide a household appliance, including: a memory, a processor, and a network configuration program of a household appliance stored in the memory and running on the processor, when the processor executes the network configuration program, the method of any one of the above embodiments is implemented.

The embodiments of the present disclosure further provide a computer storage medium, the computer storage medium stores a network configuration program of a household appliance, and the network configuration program includes a network configuration program running on a control terminal to implement the above method, or a network configuration program running on the household appliance to implement the above method.

BENEFITS

The embodiments of the present disclosure provide a method for configuring a network for a household appliance. The household appliance waiting for network configuration sends a network configuration connection request, that is, the connection information for the control terminal to connect. After the control terminal searches for the connection information and establishes a connection with the household appliance, the network configuration information is sent to the household appliance, so that the household appliance can quickly and effectively configure the network and connect to the router according to the network configuration information. After the network configuration is successfully performed, the control terminal is authenticated, thereby preventing other illegal control terminals from controlling the household appliance, and ensuring the legality of controlling the household appliance.

Figure 1:
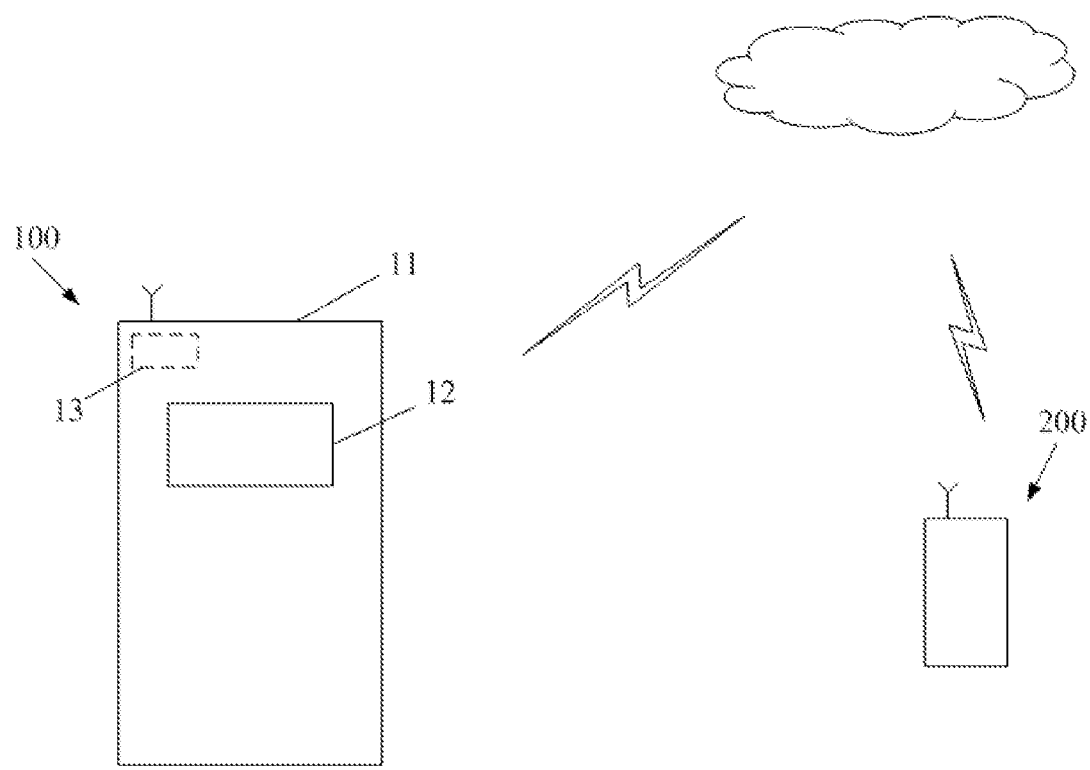
FIG. 1 is a schematic structural diagram of a household appliance according to an embodiment of the present disclosure.

The realization of the objective, functional characteristics, and advantages of the present disclosure are further described with reference to the accompanying drawings.

DETAILED DESCRIPTION OF THE EMBODIMENTS

For better understanding of the above technical solutions, exemplary embodiments of the present disclosure will be described in more detail below with reference to the accompanying drawings. While exemplary embodiments of the present disclosure are shown in the drawings, it should be understood that the present disclosure may be embodied in various forms and should not be limited by the embodiments set forth herein. Rather, these embodiments are provided so that the present disclosure will be more thoroughly understood, and will fully convey the scope of the present disclosure to those skilled in the art.

The embodiments of the present disclosure provide a method for configuring a network for a household appliance, such that the control terminal can effectively and reliably configure the network for the household appliance.

As shown in FIG. 1, FIG. 1 is a schematic structural diagram of a household appliance according to an embodiment of the present disclosure.

Household appliances include, for example, washing machines, refrigerators, rice cookers, mopping robots, TVs, speakers, and the like. Each of the household appliances 100 includes a housing 11. The shape of the housing 11 and the structure on the housing are not limited to the shape and structure shown in the figures, and can be designed into suitable shape according to practical applications. The housing 11 is provided with an input/output module 12, such as a display screen, a button, or a combination of the two. Moreover, the input/output module 12 is further provided with a button (not shown in the figure) for realizing quick control, and the button may be a physical button or a virtual button. The input/output module may also be a structure such as a speech recognizer for interacting with the user.

Figure 2:
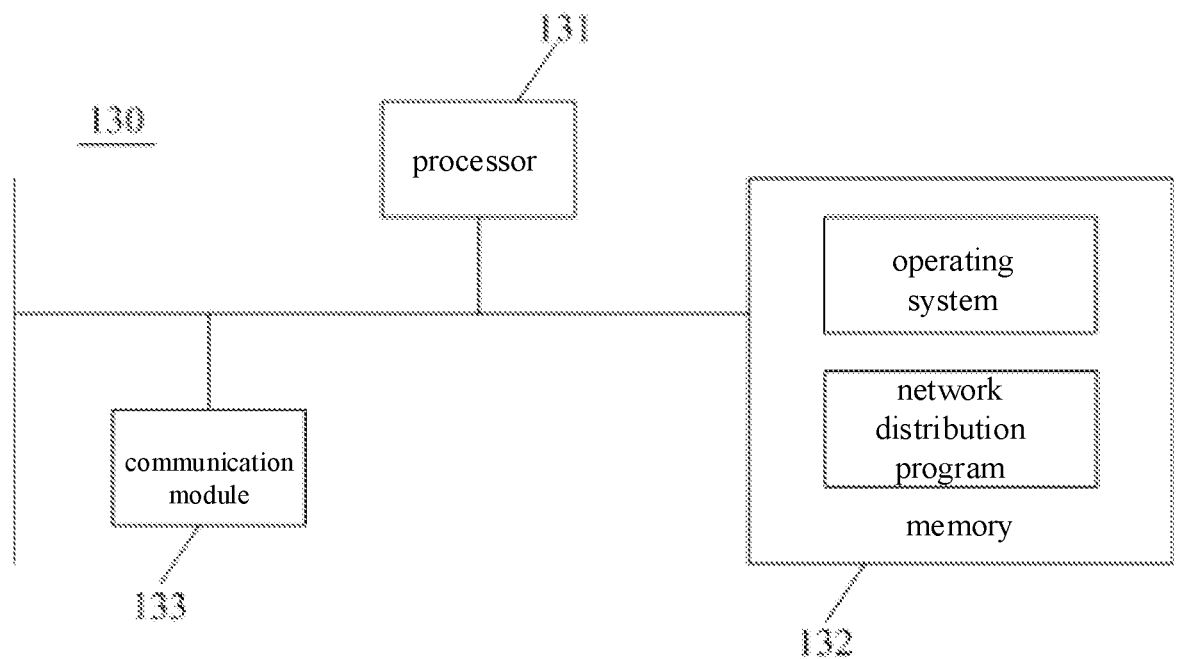
FIG. 2 is a schematic diagram of functional modules of a control circuit board in the household appliance in FIG. 1.

As shown in FIG. 2, FIG. 2 is a schematic diagram of functional modules of a control circuit board in a household appliance according to an embodiment of the present disclosure. A control circuit board 13 is provided in the housing 11, and the control circuit board 13 is electrically connected to the input/output module 12. The control circuit board 13 includes a processor 131, a memory 132, and a communication module 133 for communicating with external devices. The memory 132 may include a storage module integrated on the control circuit board 13, or may be a storage device electrically connected to the control circuit board 13. The memory 132 stores a computer program for the processor 131 to call and execute the network configuration method in the embodiment of the present disclosure, to configure the network for the household appliance.

Those skilled in the art can understand that the structures shown in FIG. 1 and FIG. 2 do not limit the household appliance 100, and the household appliance may include more or fewer components than those shown, or a combination of some components, or differently arranged components shown in the figures.

As shown in FIG. 2, the memory 132, which is a computer storage medium, may further include an operating system and a network configuration program of a household appliance.

In the control circuit board 13 shown in FIG. 2, the processor 131 may call the network configuration program of the household appliance stored in the memory 132, and perform the following operations.

The household appliance sends a network configuration connection request, the network configuration connection request includes connection information of the household appliance, to make the control terminal send the network configuration information after connecting with the household appliance through the connection information.

The network configuration information sent by the control terminal is received, and the network configuration is performed according to the received network configuration information.

After the network configuration is successfully performed, the control terminal is authenticated to realize control of the household appliance by the control terminal.

In the implementations of the present disclosure, the processor 131 calls and runs the network configuration program of the household appliance. The household appliance waiting for network configuration sends a network configuration connection request, that is, the connection information for the control terminal to connect. After the connection is established, the network configuration information sent from the control terminal can be received, and the network configuration can be quickly and effectively performed and the control terminal is connected to the router according to the received network configuration information. After the network configuration is successfully performed, the control terminal is authenticated, thereby preventing other illegal control terminals from controlling the household appliance, and ensuring the legality of controlling the household appliance.

In some embodiments, the above-mentioned processor 131 may call the network configuration program of the household appliance stored in the memory 132, and perform the following operations.

When the household appliance is powered on, the network configuration connection request is generated.

In some embodiments, the above-mentioned processor 131 may call the network configuration program of the household appliance stored in the memory 132, and perform the following operations.

If the household appliance is a Bluetooth device, the household appliance sends a network configuration connection request by broadcasting; if the household appliance is a WiFi device, the household appliance sends the network configuration connection request through a hotspot.

In some embodiments, the above-mentioned processor 131 may call the network configuration program of the household appliance stored in the memory 132, and perform the following operations.

After the network configuration is successfully performed, it is determined whether the preset button of the household appliance is triggered.

When the preset button of the household appliance is triggered, it is determined that the control terminal has been authenticated.

Figure 3:
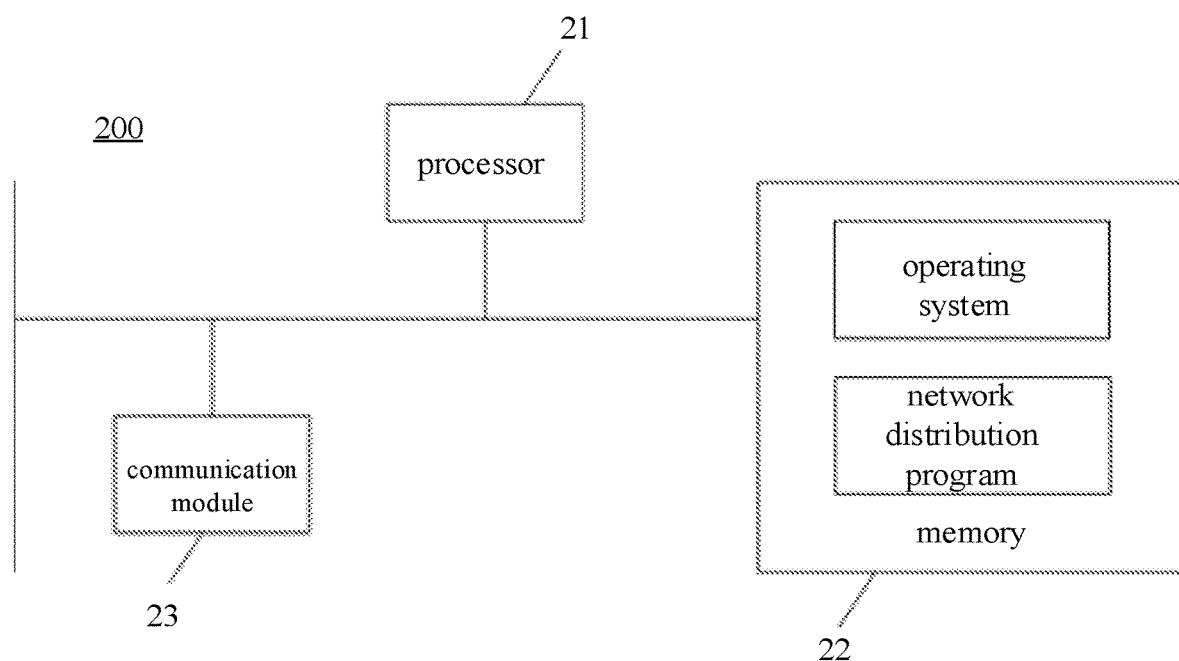
FIG. 3 is a schematic diagram of functional modules of a control terminal in FIG. 1.

As shown in FIG. 3, FIG. 3 is a schematic diagram of functional modules of a control terminal according to an embodiment of the present disclosure. The control terminal 200 includes a processor 21, a memory 22, and a communication module 23 for communicating with external devices. The memory 22 stores a computer program for the processor 21 to call and execute the network configuration method in the embodiment of the present disclosure, to configure the network for the household appliance.

Besides, the memory 22, which is a computer storage medium, may further include an operating system and a network configuration program of the household appliance.

In the control device shown in FIG. 3, the processor 21 may call the network configuration program of the household appliance stored in the memory 22, and perform the following operations.

The control terminal searches for the connection information of the nearby household appliance, and establishes a connection with the household appliance when the connection information of the household appliance is found.

The network configuration information corresponding to the household appliance is sent to the household appliance that has established a connection, to make the household appliance perform network configuration according to the network configuration information.

After the network configuration is successfully performed, the control terminal is authenticated, to realize control of the household appliance by the control terminal.

In the implementations of the present disclosure, the processor 21 calls and runs the network configuration program of the household appliance. The control terminal searches for the connection information of the nearby household appliance to establish a connection with the household appliance. Therefore, the network configuration information of the household appliance is sent to the connected household appliance, so that the household appliance can quickly and effectively perform network configuration and connect to the router according to the network configuration information. After the network configuration is successfully performed, the control terminal is authenticated, thereby preventing other illegal control terminals from controlling the household appliance, and ensuring the legality of controlling the household appliance.

In some embodiments, the processor 21 may call the network configuration program of the household appliance stored in the memory 22, and perform the following operations.

After the network configuration is successfully performed, authorization guide prompt information is generated, to make the control terminal generate an authorization request to a cloud server according to the authorization guide.

When an authorization response from the cloud server is received, it is determined that the control terminal has been authenticated.

In some embodiments, the processor 21 may call the network configuration program of the household appliance stored in the memory 22, and perform the following operations.

After the network configuration is successfully performed, an authorization request is sent to the cloud server, so that the cloud server returns an authorization response when the preset button of the household appliance is triggered according to the authorization request;

When the authorization response from the cloud server is received, it is determined that the control terminal has been authenticated.

In some embodiments, the above-mentioned processor 21 may call the network configuration program of the household appliance stored in the memory 22, and perform the following operations.

After the network configuration is successfully performed, the signal strength of the control terminal is sent to the server, and the authorization request is sent to the cloud server, for the cloud server to determine whether a distance between the control terminal and the household appliance is within a preset distance range according to the signal strength of the control terminal, when the distance between the control terminal and the household appliance is within the preset distance range, an authorization response is returned.

When the authorization response is received, it is determined that the control terminal has been authenticated.

In some embodiments, the processor 21 may call the network configuration program of the household appliance stored in the memory 22, and perform the following operations.

The control terminal acquires the device information of the household appliance waiting for network configuration, to make the control terminal search for connection information of the household appliance matching the type of the household appliance in the device information.

Figure 4:
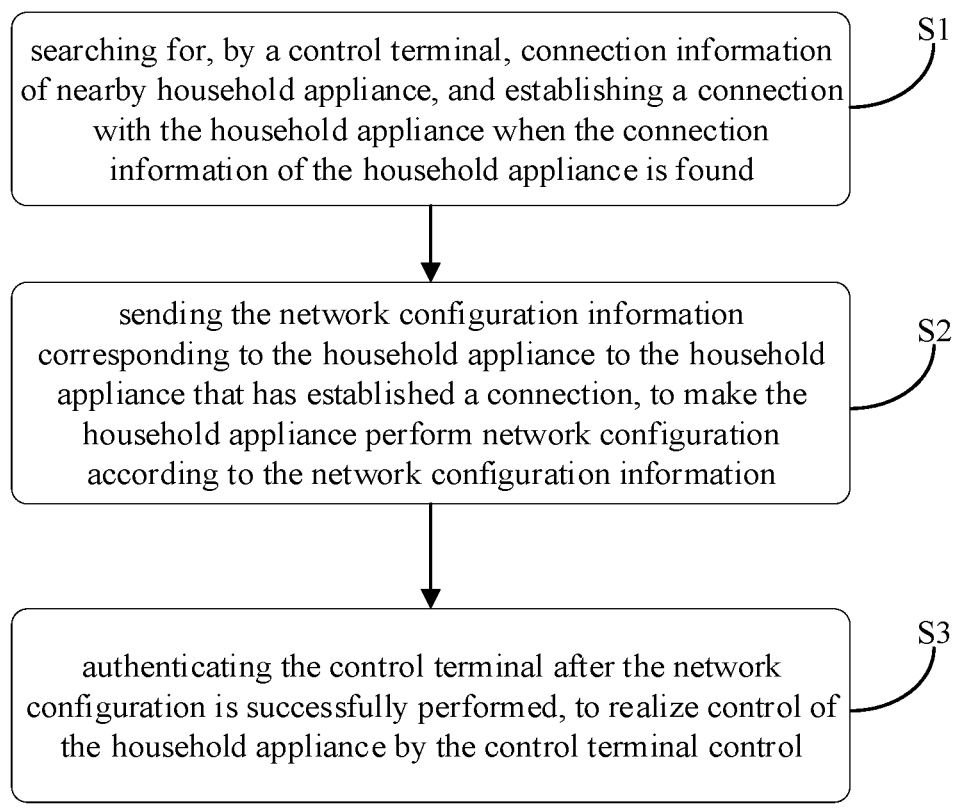
FIG. 4 is a schematic flowchart of a method for configuring a network for a household appliance according to an embodiment of the present disclosure.

As shown in FIG. 4, FIG. 4 is a schematic flowchart of a method for configuring a network for a household appliance according to an embodiment of the present disclosure.

In this embodiment, the method for configuring the network for the household appliance includes the following operations:

S1, searching for, by a control terminal, connection information of nearby household appliance, and establishing a connection with the household appliance when the connection information of the household appliance is found.

The connection information includes, for example, the hotspot information of the household appliance for other devices to search for and connect. When the household appliance needs to be networked, the control terminal starts a network configuration program, searches for connection information of nearby household appliance, and establishes a connection with the household appliance based on the searched connection information. In order to ensure that the connected household appliance is a household appliance for which the user needs to configure network, the search result may be displayed to the user for confirmation. If there are multiple pieces of household appliance information searched, the search result may also be displayed to the user for confirmation. After receiving the confirmation response, the control terminal establishes a connection with the household appliance corresponding to the confirmed connection information.

S2, sending the network configuration information corresponding to the household appliance to the household appliance that has established a connection, to make the household appliance perform network configuration according to the network configuration information.

After the connection between the control terminal and the household appliance is established, the control terminal can send the network configuration information corresponding to the household appliance to the household appliance through the established communication link, so that the household appliance can perform network configuration according to the network configuration information. The network configuration information, such as router information for access to the network, secure random numbers, account information of the control terminal, etc., is used for network configuration of household appliances. The household appliance connects to the router according to the network configuration information, and logs into the cloud server to authenticate the household appliance.

S3, authenticating the control terminal after the network configuration is successfully performed, to realize control of the household appliance by the control terminal.

Since operations S1 and S2 are only for network configuration, that is, the household appliance is successfully accessed to the cloud server, and the corresponding relationship between the household appliance and the control terminal is established, but the control terminal is not authenticated. In order to prevent other illegal control terminals from controlling the household appliance, after the network is successfully configured for household appliance, the household appliance is authenticated. Therefore, not only fast and effective network configuration is ensured, but also the control terminal is authenticated, to reliably control the household appliance.

In the implementation of the present disclosure, the control terminal searches for the connection information of the nearby household appliance, to establish a connection with the household appliance and send the network configuration information of the household appliance to the connected household appliance, so that the household appliance can perform fast and effective network configuration according to the network configuration information, and successfully connect to the router. After the network configuration is successfully performed, the control terminal is authenticated, thereby preventing other illegal control terminals from controlling the household appliance, and ensuring the legality of controlling the household appliance.

Further, before the operation S1, the method further includes: obtaining, by the control terminal, device information of the household appliance waiting for network configuration, to make the control terminal search for the connection information of the household appliance matching a type of the household appliance in the device information.

In order to ensure the connection reliability of the household appliance, the control terminal will also obtain the device information of the household appliance waiting for configuration, for example, by scanning the identification code on the household appliance, thus the type of the household appliance can be identified, such as an air conditioner, a refrigerator, a TV, a washing machine, or the like. After the type of the household appliance is identified, it is also convenient to automatically filter the household appliance matching the type of the household appliance for connection when searching for connection information. In addition, after the control terminal obtains the device information of the household appliance waiting for configuration by scanning, the household appliance can be added to the control program to facilitate subsequent control.

Figure 5:
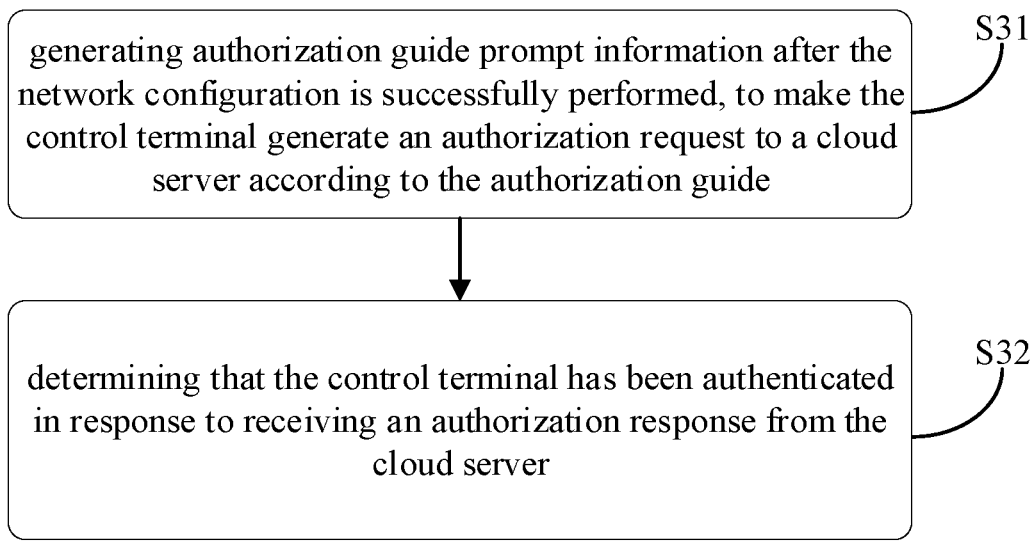
FIG. 5 is a detailed flowchart of operation S3 in FIG. 4 according to an embodiment of the present disclosure.

Further, as shown in FIG. 5, FIG. 5 is a detailed flowchart of operation S3 in FIG. 4 according to an embodiment of the present disclosure. The operation S3 includes:

S31, generating authorization guide prompt information after the network configuration is successfully performed, to make the control terminal generate an authorization request to a cloud server according to the authorization guide.

S32, determining that the control terminal has been authenticated in response to receiving an authorization response from the cloud server.

In order to realize control of the household appliance by the control terminal, after the network configuration is successfully performed, the authorization guide prompt information can be generated, so as to guide the control terminal to perform corresponding operations according to the authorization guide prompt. The authorization guide prompt information includes, for example, "The preset button executes the preset operation," "Bring the control terminal close to the household appliance," and the like. When the corresponding operation is triggered, an authorization request is generated, and the generated authorization request is sent to the cloud server. When the cloud server receives the authorization request, the control terminal is authenticated, and the authorization response is returned after the authorization is successful. Therefore, when the control terminal receives the authorization response from the household appliance, it determines that the household appliance has been authenticated.

In some embodiments of the present disclosure, through the authorization guide prompt information, after the network is configured for the household appliance, the control terminal can complete the authorization more quickly and efficiently, to reliably control the household appliance.

Figure 6:
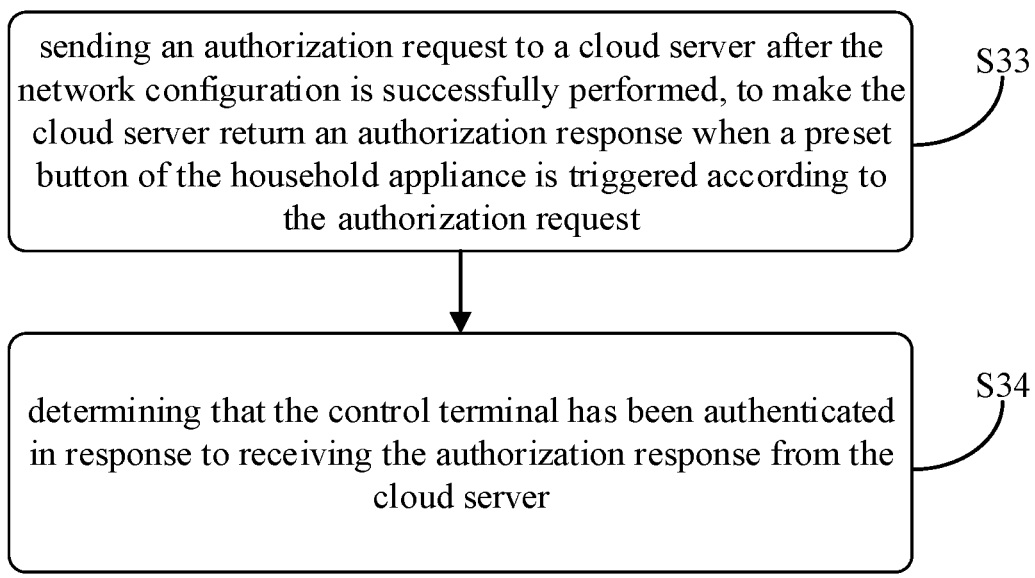
FIG. 6 is a detailed flowchart of operation S3 in FIG. 4 according to another embodiment of the present disclosure.

In another embodiment, as shown in FIG. 6, FIG. 6 is a detailed flowchart of operation S3 in FIG. 4 according to another embodiment of the present disclosure. The operation S3 includes:

S33, sending an authorization request to a cloud server after the network configuration is successfully performed, to make the cloud server return an authorization response when a preset button of the household appliance is triggered according to the authorization request; and S34, determining that the control terminal has been authenticated in response to receiving the authorization response from the cloud server.

After the network is successfully configured for the household appliance, since the control terminal needs to be authenticated, if the household appliance is a WiFi type device, it is necessary to press the preset hot key for a long time, such as the WiFi button on the household appliance or the remote control of the household appliance. When the cloud server receives the authorization request, it sends the authorization request to the household appliance, and the household appliance is authenticated by pressing the preset hot key for a long time. When the preset hot key is triggered by a long press, the household appliance generates an authorization response to the cloud server. After receiving the authorization response, the cloud server determines the legitimacy of the control terminal, and returns the authorization response to the control terminal. When receiving the authorization response from the household appliance, it is determined that the household appliance device has been authenticated, and then the household appliance can be controlled.

In technical solutions of the present disclosure, the preset hot key is set to trigger the authorization, which is convenient to operate, simple and reliable, not only improves the efficiency of configuring the network, but also reliably controls the household appliance.

Figure 7:
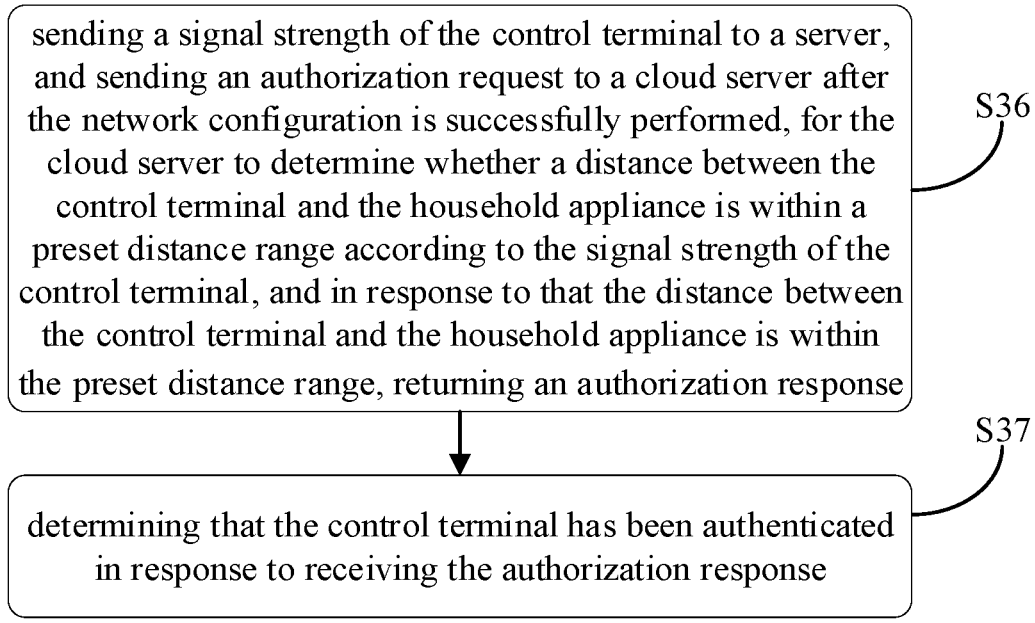
FIG. 7 is a detailed flowchart of operation S3 in FIG. 4 according to still another embodiment of the present disclosure.

In still another embodiment, as shown in FIG. 7, FIG. 7 is a detailed flowchart of operation S3 in FIG. 4 according to still another embodiment of the present disclosure. The operation S3 includes:

S36, sending a signal strength of the control terminal to a server, and sending an authorization request to a cloud server after the network configuration is successfully performed, for the cloud server to determine whether a distance between the control terminal and the household appliance is within a preset distance range according to the signal strength of the control terminal, and in response to that the distance between the control terminal and the household appliance is within the preset distance range, returning an authorization response; and S37, determining that the control terminal has been authenticated in response to receiving the authorization response.

After the network configuration is successfully performed, the control terminal is moved to the preset distance range from the household appliance, and then the authorization is triggered. The signal strength of the control terminal is sent to the cloud server. According to the signal strength of the control terminal, the cloud server calculates the distance between the control terminal and the household appliance, and determines whether the distance between the control terminal and the household appliance is within the preset distance range. When the distance between the control terminal and the household appliance is within the preset distance range, it is determined that the control terminal has been authenticated, and then the cloud serve returns the authorization response to the control terminal.

Figure 8:
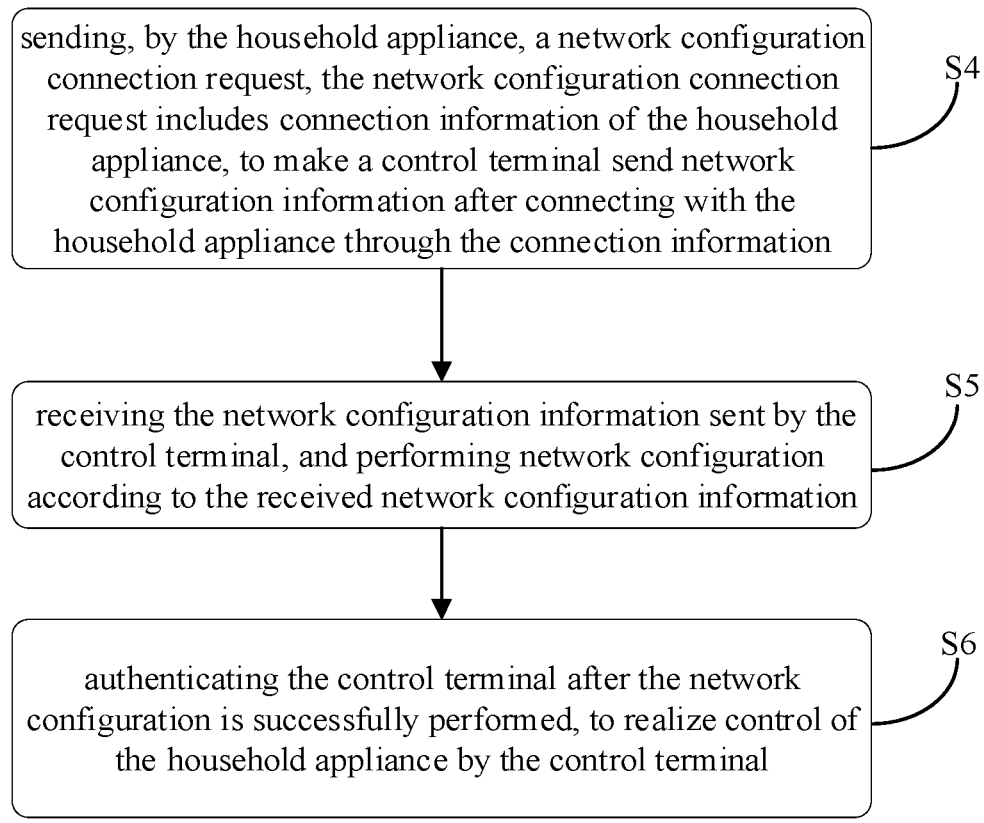
FIG. 8 is a schematic flowchart of a method for configuring a network for a household appliance according to an embodiment of the present disclosure.

The embodiments of the present disclosure further provide a method for configuring a network for a household appliance, which is applied to the household appliance end. As shown in FIG. 8, the method includes following operations.

S4, sending, by the household appliance, a network configuration connection request, the network configuration connection request includes connection information of the household appliance, to make a control terminal send network configuration information after connecting with the household appliance through the connection information.

When the household appliance needs to perform network configuration, a network configuration connection request is sent so that other devices can discover the household appliance and establish a connection with the household appliance. Therefore, the control terminal can find the household appliance by searching, and establish a connection with the household appliance. Then, the control terminal sends the network configuration information corresponding to the household appliance to the household appliance through the established communication link. Further, in order to improve the speed of the network configuration, when the household appliance is powered on, it automatically sends a network configuration connection request. The household appliance can first determine whether the network has been configured, and if not, the household appliance sends the network configuration connection request. When the household appliance is a Bluetooth device, the household appliance sends the network configuration connection request by starting a Bluetooth broadcast; or when the household appliance is a WiFi device, the household appliance sends the network configuration connection request by starting a wireless access point.

S5, receiving the network configuration information sent by the control terminal, and performing network configuration according to the received network configuration information.

After receiving the network configuration information sent by the control terminal, the household appliance can perform network configuration according to the network configuration information. For example, the network configuration includes information of routers connected to the network, so that the household appliance can be connected to the router, and logged into the server through the router, so as to bind the household appliance and the control terminal, and so on.

S6, authenticating the control terminal after the network configuration is successfully performed, to realize control of the household appliance by the control terminal.

In the implementations of the present disclosure, the household appliance waiting for configuration sends the network configuration connection request, that is, the connection information for the control terminal to connect. After the connection is established, the system can receive the network configuration information from the control terminal and configure the network quickly and effectively based on the received network configuration information. After successfully configuring the network, the household appliance is authenticated, which prevents other illegal control terminals from controlling the household appliance and ensures the legitimacy of controlling the household appliance.

Further, in an embodiment, after the network is successfully configured for the household appliance, since the control terminal needs to be authenticated, if the household appliance is a WiFi type device, it is necessary to press the preset hot key for a long time, such as the WiFi button on the household appliance or the remote control of the household appliance. When the preset hot key is triggered by pressing for a long time, the control terminal is authenticated. After receiving the authorization request, the household appliance will confirm the right of the control terminal to determine the validity of the control terminal, and return the authorization response after the authorization is successful. The authorization can be carried out by the household appliance, or the authorization can be uploaded by the household appliance to the cloud server for authorization. When receiving the authorization response from the household appliance, it is determined that the household appliance has been authenticated, and then the household appliance can be controlled.

In technical solutions of the present disclosure, the preset hot key is set to trigger the authorization, which is convenient to operate, simple and reliable, not only improves the efficiency of configuring the network, but also reliably controls the household appliance.

Figure 9:
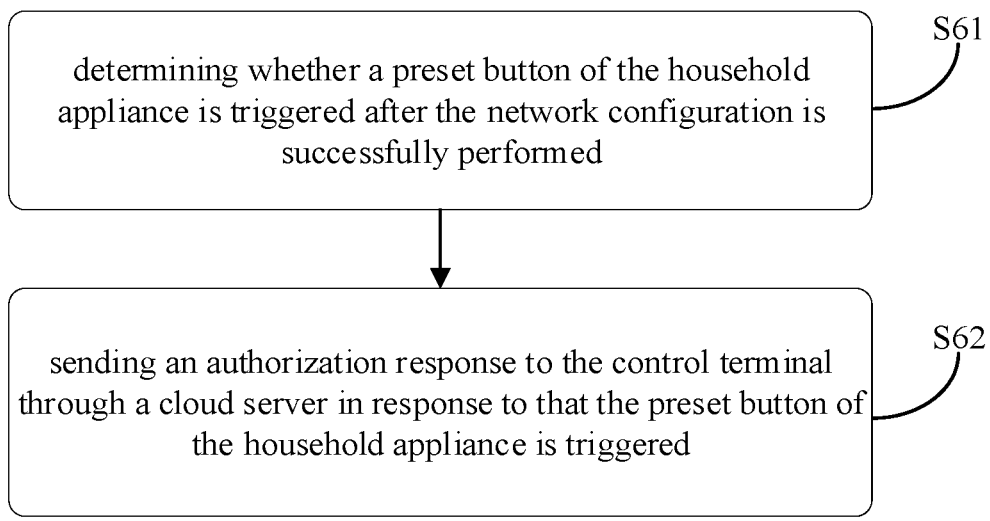
FIG. 9 is a detailed flowchart of operation S6 in FIG. 8 according to an embodiment of the present disclosure.

In another embodiment, as shown in FIG. 9, FIG. 9 is detailed flowchart of operation S6 in FIG. 8 according to an embodiment of the present disclosure. The operation S6 includes:

S61, determining whether a preset button of the household appliance is triggered after the network configuration is successfully performed; and S62, sending an authorization response to the control terminal through a cloud server in response to that the preset button of the household appliance is triggered.

After the network is successfully configured for the household appliance, if the household appliance is a WiFi type device, it is necessary to press the preset hot key for a long time, such as the WiFi button on the household appliance or the remote control of the household appliance. When the control terminal enters the control interface, the household appliance needs to be authenticated because there is no authorization. In this case, the control terminal triggers the authorization according to the authorization confirmation and sends the authorization request to the cloud server. The cloud server will send the authorization request to the household appliance, and the household appliance will be authenticated by pressing the preset hot key for a long time. When the preset hot key is triggered by a long press, the household appliance generates an authorization response to the cloud server. After receiving the authorization response, the cloud server determines the legitimacy of the control terminal, and returns the authorization response to the control terminal. When receiving the authorization response from the household appliance, it is determined that the household appliance device has been authenticated, and then the household appliance can be controlled.

In technical solutions of the present disclosure, the preset hot key is set to trigger the authorization, which is convenient to operate, simple and reliable, not only improves the efficiency of configuring the network, but also reliably controls the household appliance.

Figure 10:
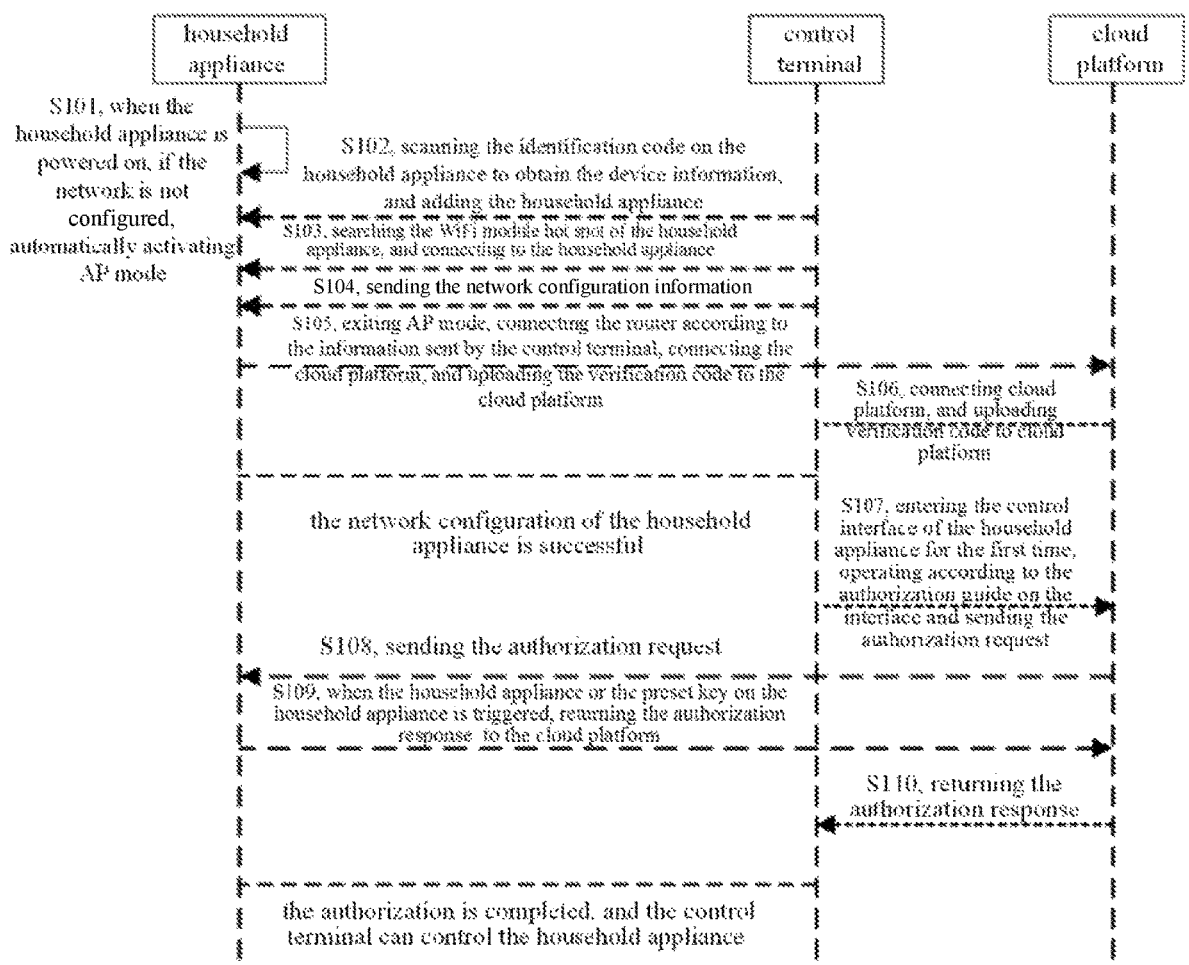
FIG. 10 is a network configuration process diagram of an application example according to an embodiment of the present disclosure.
Figure 11:
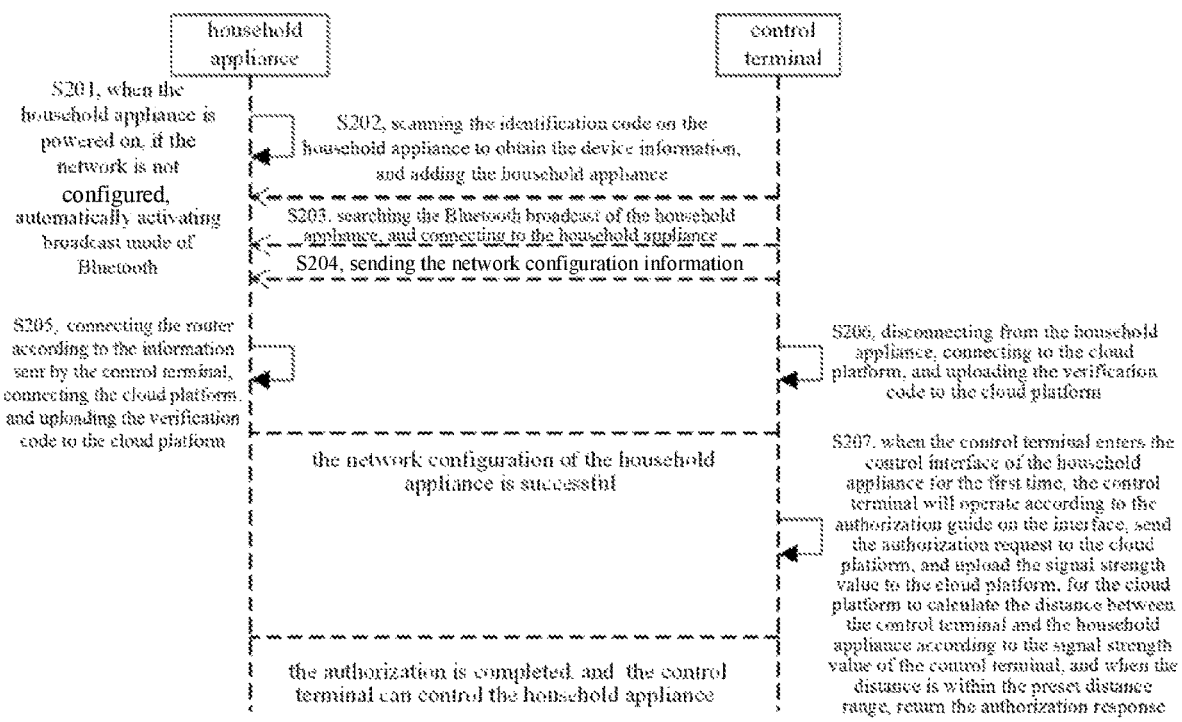
FIG. 11 is a network configuration process diagram of another application example according to an embodiment of the present disclosure.

As shown in FIG. 10, FIG. 10 shows an example of network configuration when the household appliance device is a WiFi device according to an embodiment of the present disclosure, including:

S101, when the household appliance is powered on, if the network is not configured for the household appliance, the WiFi AP (wireless access) mode will be automatically activated, so that other devices can discover the household appliance through search;

S102, the control terminal scans the identification code on the household appliance to obtain the device information of the household appliance, and adds the household appliance to the control terminal;

S103, the control terminal searches the WiFi module hot spot of the household appliance, and connects to the household appliance;

S104, the control terminal sends the network configuration information, such as router information, secure random number to the household appliance;

S105, the household appliance exits the AP mode, connects the router according to the information sent by the control terminal, connects to the cloud platform, and uploads the verification code to the cloud platform;

S106, the control terminal is disconnected from the household appliance, connects to the cloud platform, and uploads the verification code to the cloud platform, for the cloud platform to successfully verify the household appliance and control terminal, and bind the control terminal and household appliance;

S107, when the control terminal enters the control interface of the household appliance for the first time, the control terminal operates according to the authorization guide on the interface and sends the authorization request to the cloud platform;

S108, the cloud platform receives the authorization request and sends the authorization request to the household appliance;

S109, when the household appliance or the preset key on the household appliance is triggered, the authorization response is returned to the cloud platform;

S110, the cloud platform returns the authorization response to the control terminal to realize control of the household appliance by the control terminal.

It should be noted that although the control terminal is bound to the household appliance, the control terminal without the authorization cannot control the household appliance. After the control terminal is authenticated, the cloud server will send the control command of the control terminal to the household appliance to control the operation of the household appliance. After the cloud platform successfully verifies the control terminal and the household appliance, the information about the control terminal and the household appliance is recorded, and the control terminal is bound to the household appliance after the control terminal is authenticated.

As shown in FIG. 10, FIG. 10 shows an example of network configuration when the household appliance device is a Bluetooth device according to an embodiment of the present disclosure, including:

S201, when the household appliance is powered on, if the network is not configured for the household appliance, the broadcast mode of Bluetooth is automatically activated, so that other devices can discover the household appliance through search;

S202, the control terminal scans the identification code on the household appliance to obtain the device information of the household appliance, and adds the household appliance to the control terminal;

S203, the control terminal searches the broadcast information of the household appliance, and connects to the household appliance;

S204, the control terminal sends the network configuration information, such as router information, secure random number to the household appliance;

S205, the household appliance connects the router according to the information sent by the control terminal, connects to the cloud platform, and uploads the verification code to the cloud platform;

S206, the control terminal is disconnected from the household appliance, connects to the cloud platform, and uploads the verification code to the cloud platform, for the cloud platform to successfully verify the household appliance and control terminal, and bind the control terminal and household appliance;

S207, when the control terminal enters the control interface of the household appliance for the first time, the control terminal will operate according to the authorization guide on the interface (for example, close to the household appliance), send the authorization request to the cloud platform, and upload the signal strength value to the cloud platform, for the cloud platform to calculate the distance between the control terminal and the household appliance according to the signal strength value of the control terminal, and when the distance is within the preset distance range, the authorization response is returned to realize control of the household appliance by the control terminal.

Those skilled in the art should understand that the embodiments of the present disclosure may be offered as a method, a system, or a computer program product. Therefore, the present disclosure may take the form of hardware embodiments, software embodiments, or a combination of software and hardware aspects. Besides, the present disclosure may take the form of a computer program product implemented on one or more computer usable storage media (including but not limited to disk memory, CD-ROM, optical memory, etc.) containing computer usable program code.

The present disclosure is described with reference to the flowchart and/or the block diagram of the method, device (system), and computer program products according to the embodiments of the present disclosure. Each of the processes and/or blocks in the flowchart and/or block diagram and the combination of the processes and/or blocks in the flowchart and/or block diagram should be understood to be implemented by computer program instructions. These computer program instructions may be supplied to the processor of a general-purpose computer, a special-purpose computer, an embedded processor, or other programmable data-processing device to produce a machine, such that the instructions executed by the processor of a computer or other programmable data processing device produce a device for implementing the functions specified in a flowchart or processes and/or a block or blocks in a block diagram. These computer program instructions can also be stored in computer readable memory that can guide a computer or other programmable data-processing device to work in a particular way, such that the instructions stored in the computer readable memory produce manufactured articles including instruction devices. The instruction device implements the functions specified of a process or processes in a flowchart and/or a block or blocks in a block diagram.

These computer program instructions may also be loaded onto a computer or other programmable data processing device so that a sequence of operations can be performed on the computer or other programmable device to produce the processing implemented by the computer, thus the instructions executed on a computer or other programmable device provide the steps for implementing the functions specified of a process or processes in a flowchart and/or a block or blocks in a block diagram.

It should be noted that any reference sign between brackets in the claim should not be constructed as a restriction on the claim. The word "include" does not exclude the existence of parts or steps not listed in the claim. The word "a" or "an" before a part does not exclude the existence of more than one such part. The present disclosure may be carried out with the aid of hardware including a number of different components and with the aid of a suitably programmed computer. In a unit claim that lists several devices, several of these devices may be embodied by the same hardware item. The use of the words first, second, and third do not indicate any order. These words can be interpreted as names.

Although some embodiments of the present disclosure have been described, additional changes and modifications may be made to these embodiments by technical personnel in the field once the basic creative concepts are known. The attached claim is therefore intended to be construed to include preferred embodiments and all alterations and modifications falling within the scope of the present disclosure.

Obviously, the technical personnel in this field may make various changes and variations to the present disclosure without departing from the spirit and scope of the present disclosure. Thus, to the extent that such modifications and variations of the present disclosure fall within the scope of the claim and its equivalent, the present disclosure is intended to include such modifications and variations.

What is claimed is:

1. A household appliance network configuration method comprising
    searching, by a control terminal, for connection information;
    establishing, by the control terminal, a connection with a household appliance in response to finding the connection information of the household appliance;
    sending network configuration information corresponding to the household appliance to the household appliance, to cause the household appliance to perform network configuration according to the network configuration information; and
    authenticating the control terminal after the network configuration is successfully performed, wherein authenticating the control terminal includes:
    sending an authorization request to a cloud server after the network configuration is successfully performed, to cause the cloud server to return an authorization response according to the authorization request in response to a preset button of the household appliance being triggered; and
    determining that the control terminal has been authenticated in response to receiving the authorization response from the cloud server.

2. The method of claim 1, wherein authenticating the control terminal includes: generating and sending an authorization request to a cloud server according to an authorization guide, prompt information of the authorization guide being generated after the network configuration is successfully performed; and determining that the control terminal has been authenticated in response to receiving an authorization response from the cloud server.

3. The method of claim 2, wherein the prompt information of the authorization guide prompt information includes "Execute a preset operation on a preset button" or "Bring the control terminal close to the household appliance".

4. The method of claim 1, wherein authenticating the control terminal includes: sending a signal strength of the control terminal and an authorization request to a cloud server after the network configuration is successfully performed, for the cloud server to determine whether a distance between the control terminal and the household appliance is within a preset distance range according to the signal strength of the control terminal and, in response to the distance being within the preset distance range, return an authorization response; and determining that the control terminal has been authenticated in response to receiving the authorization response.

5. The method of claim 1, further comprising, before searching for the connection information: obtaining, by the control terminal, device information; wherein searching for the connection information includes searching for connection information of a household appliance matching a household appliance type in the device information.

6. A control terminal comprising: a processor; and a memory storing a household appliance network configuration program that, when executed by the processor, causes the processor to perform the method of claim 1.

7. A non-transitory computer storage medium storing a household appliance network configuration program that, when executed by a processor, cause the processor to perform the method of claim 1.

8. A household appliance network configuration method comprising: sending, by a household appliance, a network configuration connection request, the network configuration connection request including connection information of the household appliance; receiving network configuration information sent by a control terminal after connecting to the household appliance via the connection information; performing network configuration according to the network configuration information; and authenticating the control terminal after the network configuration is successfully performed, wherein authenticating the control terminal includes:
    determining whether a preset button of the household appliance is triggered after the network configuration is successfully performed; and
    sending an authorization response to the control terminal through a cloud server in response to the preset button being triggered.

9. The method of claim 8, further comprising, before sending the network configuration connection request: generating the network configuration connection request in response to the household appliance being powered on.

10. The method of claim 8, wherein sending the network configuration connection request includes: in response to the household appliance being a Bluetooth device, sending the network configuration connection request by starting a Bluetooth broadcast; or in response to the household appliance being a WiFi device, sending the network configuration connection request by starting a wireless access point.

11. A household appliance comprising: a processor; and a memory storing a household appliance network configuration program that, when executed by the processor, causes the processor to perform the method of claim 8.

12. A non-transitory computer storage medium storing a household appliance network configuration program that, when executed by a processor, cause the processor to perform the method of claim 8.

* * * * *